United States Patent
Shimomura et al.

(10) Patent No.: US 9,751,325 B2
(45) Date of Patent: Sep. 5, 2017

(54) INKJET PRINTING METHOD AND INKJET PRINTER USED IN THE PRINTING METHOD

(71) Applicant: RISO KAGAKU CORPORATION, Tokyo (JP)

(72) Inventors: Kenji Shimomura, Ibaraki (JP); Hiroshi Hayashi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 139 days.

(21) Appl. No.: 14/576,397

(22) Filed: Dec. 19, 2014

(65) Prior Publication Data
US 2015/0183229 A1 Jul. 2, 2015

(30) Foreign Application Priority Data

Dec. 27, 2013 (JP) .................................. 2013-272619

(51) Int. Cl.
*B41J 2/21* (2006.01)
*B41M 5/00* (2006.01)
*C09D 11/322* (2014.01)

(52) U.S. Cl.
CPC ........... *B41J 2/2107* (2013.01); *B41J 2/2146* (2013.01); *B41M 5/0011* (2013.01); *C09D 11/322* (2013.01)

(58) Field of Classification Search
CPC ....................................................... B41M 1/18
See application file for complete search history.

(56) References Cited

U.S. PATENT DOCUMENTS

| | | | | |
|---|---|---|---|---|
| 7,448,719 B1 * | 11/2008 | Newell | ................. | B41J 29/393 347/12 |
| 7,722,180 B2 | 5/2010 | Mashima | | |
| 2006/0139427 A1 * | 6/2006 | Makino | ................. | C09D 11/36 347/100 |
| 2011/0193905 A1 * | 8/2011 | Miyamoto | ............. | B41J 2/2121 347/14 |
| 2012/0266779 A1 * | 10/2012 | Morinaga | ............. | C09D 11/36 106/31.75 |

FOREIGN PATENT DOCUMENTS

| | | |
|---|---|---|
| JP | H05-320551 A | 12/1993 |
| JP | H09-254527 A | 9/1997 |
| JP | 2001-171103 A | 6/2001 |
| JP | 2005-350493 A | 12/2005 |
| JP | 2007-015130 A | 1/2007 |

OTHER PUBLICATIONS

Japanese Office Action issued with respect to Application No. 2013-272619, dated Apr. 4, 2017.

* cited by examiner

*Primary Examiner* — Shelby Fidler
(74) *Attorney, Agent, or Firm* — Greenblum & Bernstein, P.L.C.

(57) ABSTRACT

Using a plurality of colors of inks comprising an oil-based ink containing a dye lake pigment and an oil-based ink containing a pigment other than dye lake pigments, and superposing the plurality of colors of inks when printing, the oil-based ink containing a dye lake pigment is ejected on a printing medium prior to the oil-based ink containing a pigment other than dye lake pigments.

10 Claims, 1 Drawing Sheet

FIG. 1B2

INKJET PRINTING METHOD AND INKJET PRINTER USED IN THE PRINTING METHOD

BACKGROUND

Technical Field

The present invention relates to an inkjet printing method using an oil-based ink containing a dye lake pigment and an inkjet printer used in the printing method.

Related Art

An ink used in inkjet printing is roughly divided into an aqueous ink and a non-aqueous ink, and a non-aqueous ink is classified into a solvent-based ink containing a volatile solvent as a main solvent and an oil-based ink containing a non-volatile solvent as a main solvent. The oil-based ink does not cause curl of printed matter, and a solvent is less likely to volatilize than from aqueous inks and solvent-based inks, thus is excellent in maintainability such that clogging of the ink nozzle is unlikely to occur, and cleaning counts of the ink nozzle can be reduced, and has little burden on printing system, therefore, the oil-based ink is suitable for high-speed printing, especially, a high-speed inkjet printing of a line head system. On the other hand, the coloring material used in the oil-based ink includes dyes and pigments, and recently a pigment is increasingly used, from the viewpoint of environment resistance (preservability, water resistance, etc.) of printed matter (JP 2005-350493 A).

Incidentally, a phenomenon in which a printing image is seen through from the back side of the printed matter is referred to as "strike through". In the oil-based ink, a solvent does not volatilize and remains inside the recording medium for a long period, thus the coloring material having high affinity with the solvent is drawn into inside the recording medium with permeation of a solvent, and consequently, strike through tends to deteriorate. Also, when a dye is used as the coloring material, the dye dissolves in the solvent and sinks inside the recording medium together with the solvent, thus strike through further deteriorates.

SUMMARY

The present inventor has found that, when a dye lake pigment is used as the coloring material of an oil-based ink, high color development properties can be obtained, as compared to an oil-based ink using other pigment as the coloring material. However, a dye lake pigment has a problem of deteriorating strike through.

An object of the present invention is to provide an inkjet printing method achieving both high color development properties and reduction of strike through in the printed matter, and an inkjet printer used in the printing method.

The inkjet printing method of the present invention is an inkjet printing method using a plurality of colors of inks including an oil-based ink (A) containing a dye lake pigment and an oil-based ink (B) containing a pigment other than dye lake pigments, and superposing the plurality of colors of inks when printing, wherein the oil-based ink (A) is ejected on a printing medium prior to the oil-based ink (B).

In addition, the inkjet printer of the present invention includes an inkjet head (a) holding an oil-based ink (A) containing a dye lake pigment and an inkjet head (b) holding an oil-based ink (B) containing a pigment other than dye lake pigments, and a carrying part of the printing medium positioned facing the inkjet head, wherein the inkjet head (a) is positioned in an upstream of the inkjet head (b) in the carrying direction of the printing medium.

According to the present invention, an inkjet printing method achieving high color development properties and reduction of strike through, and an inkjet printer used in the printing method can be provided.

DETAILED DESCRIPTION

Figure 1A:
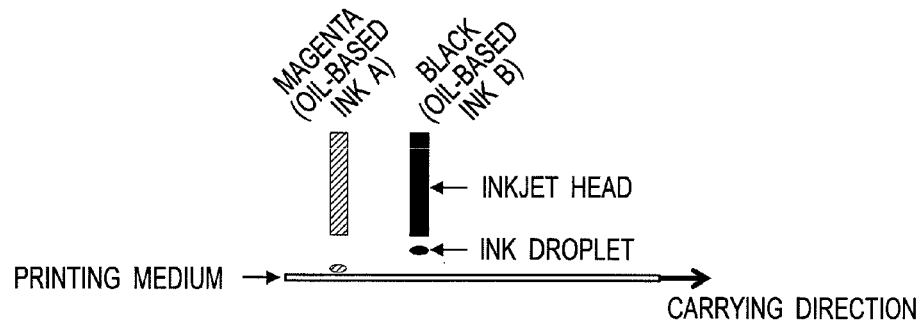
FIGS. 1A to 1C are diagrams of an embodiment of the ink ejection order and interval in the present invention.

Hereinafter, embodiments of the present invention will be described. However, examples in the embodiments will not limit the present invention.

In the inkjet printing method of the present invention, an oil-based ink (A) containing a dye lake pigment is used. As the dye lake pigment, a dye lake pigment called a basic dye lake is preferably used.

The laking agent for obtaining the dye lake pigment includes, phosphotungstic acid, phosphomolybdic acid, phosphotungsticmolybdic acid, tannic acid, lauric acid, gallic acid, ferricyanide, ferrocyanide, and the like. These laking agents can be used in combination of one or two or more kinds. Among them, it is preferred to use phosphotungstic acid and phosphomolybdic acid alone or in combination.

In addition, as the pigment used for obtaining the oil-based ink (A) containing a dye lake pigment, a pigment by laking a xanthene derivative dye or a pigment by laking a triphenylmethane derivative dye can be used. Specific examples of the pigment by laking a xanthene derivative dye include P.R.81, P.R.81:1, P.R.81:2, P.R.81:3 and P.R.81:4. Also, specific examples of the pigment by laking a triphenylmethane derivative dye include P.B.1. These pigments may be used alone or in combination of two or more kinds.

In addition, as the solvent of the oil-based ink (A) containing a dye lake pigment, it is not particularly limited as long as it is a non-aqueous solvent, and both nonpolar organic solvent and polar organic solvent can be used. These solvents can be used alone, and also can be used in combination of two or more kinds as long as the solvents form a single phase.

The nonpolar organic solvent preferably includes petroleum hydrocarbon solvents such as aliphatic hydrocarbon solvents, alicyclic hydrocarbon solvents, and aromatic hydrocarbon solvents. The aliphatic hydrocarbon solvents and the alicyclic hydrocarbon solvents include paraffin, isoparaffin, and naphthene solvents. Examples include those sold in the following trade names. Teclean N-16, Teclean N-20, Teclean N-22, Naphtesol L, Naphtesol M, Naphtesol H, No. 0 Solvent L, No. 0 Solvent M, No. 0 Solvent H, Isosol 300, Isosol 400, AF Solvent No. 4, AF Solvent No. 5, AF Solvent No. 6 and AF Solvent No. 7 (all manufactured by JX Nippon Oil & Energy Corporation); and Isopar G, Isopar H, Isopar L, Isopar M, Exxsol D40, Exxsol D80, Exxsol D100, Exxsol D130, and Exxsol D140 (all manufactured by TonenGeneral Sekiyu K.K.). The aromatic hydrocarbon solvents include Alkene L and Alkene 200P (both manufactured by JX Nippon Oil & Energy Corporation), Solvesso 200 (manufactured by TonenGeneral Sekiyu K.K.), and the like.

The polar organic solvents preferably include ester solvents, higher alcohol solvents, higher fatty acid solvents, and the like. Examples include ester solvents having a carbon number of 14 or more in a molecule such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; higher alcohol solvents having a carbon number of 8 or more in a molecule such as isomyristyl alcohol, isopalmityl alcohol, isostearyl alcohol and oleyl alcohol; higher fatty acid solvents having a carbon number of 9 or more in a molecule such as isononanoic acid, isomyristic acid, hexadecanoic acid, isopalmitic acid, oleic acid and isostearic acid, and the like.

The amount of the above nonpolar solvent added is 60% by mass or more and preferably 70 to 98% by mass of the total amount of the ink.

In addition, as the oil-based ink solvent, other than the above non-aqueous solvents, a water-soluble organic solvent can be added in a range capable of forming a single continuous liquid phase compatible with the above non-aqueous solvent. This water-soluble organic solvent is not particularly limited, and conventionally known one such as lower alcohol can be used.

In the solvent of the oil-based ink (A) containing a dye lake pigment, the additive usually used in the oil-based ink can be contained, in addition to the above components, in a range not inhibiting the object of the present invention. Specifically, the additive includes various additives such as a dispersant, a defoaming agent, an antioxidant, a viscosity modifier, and a surface tension regulator.

The solvent of the oil-based ink (A) containing a dye lake pigment may be prepared according to the conventionally known method for preparing an oil-based ink, and for example, can be prepared by putting all components at a time or dividedly in a known disperser such as a bead mill, dispersing the components, and passing the components through a known filtering machine such as a membrane filter, as desired.

In inkjet printing method of the present invention, an oil-based ink (B) containing a pigment other than dye lake pigments is used. As the pigment used for obtaining the oil-based ink (B) containing a pigment other than dye lake pigments, organic pigments such as azo pigment, phthalocyanine pigment, polycyclic pigments and inorganic pigments can be used. The azo pigment includes soluble azo lake pigments, insoluble azo lake pigments and condensed azo pigments. The phthalocyanine pigment includes metal phthalocyanine pigments and metal-free phthalocyanine pigments. The polycyclic pigment includes quinacridone pigments, perylene pigments, perynone pigments, isoindoline pigments, isoindolinone pigments, dioxazine pigments, thioindigo pigments, anthraquinone pigments, quinophthalone pigments, metal complex pigments, diketopyrrolopyrrole (DPP), and the like. The inorganic pigment representatively includes carbon black, titanium oxide and the like. These pigments can be used alone or used two or more kinds in combination. As these pigments, a chromatic pigment is preferably used.

In addition, the solvent of the oil-based ink (B) containing a pigment other than dye lake pigments is not particularly limited, and those generally used in the technical field of printing can be used. For example, the solvent used in the oil-based ink (A) containing a dye lake pigment can be used.

The oil-based ink (B) containing a pigment other than dye lake pigments can contain an additive usually used in an oil-based ink, in addition to the above components, in a range not inhibiting the object of the present invention. Specific examples include various additives such as a dispersant, a defoaming agent, an antioxidant, a viscosity modifier, and a surface tension regulator.

The oil-based ink (B) containing a pigment other than dye lake pigments may be prepared by a conventionally known method for preparing an oil-based ink, and for example, can be prepared in the same manner as the oil-based ink (A) described above.

The viscosity of both the oil-based ink (A) containing a dye lake pigment and the oil-based ink (B) containing a pigment other than dye lake pigments, though the suitable range thereof varies depending on the diameter of inkjet head nozzles, ejection environments and the like, is preferably from 5 to 30 mPa·s, more preferably from 5 to 15 mPa·s, and further preferably 8 to 12 at 23° C. Here, the viscosity represents a value measured at 10 Pa when raising the shear stress from 0 Pa at a rate of 0.1 Pa/s at 23° C.

In the inkjet printing method, an oil-based ink (A) containing at least one kind of dye lake pigments and an oil-based ink (B) containing at least one kind of a pigment other than dye lake pigments are ejected on a printing medium in a fixed order. As FIG. 1A, when using each one kind of the oil-based ink (A) and the oil-based ink (B), the oil-based ink (A) is first ejected on a printing medium, then the oil-based ink (B) is ejected (in order of (A) to (B)). When using one kind of the oil-based ink (A) and two kinds or more of the oil-based inks (B), the oil-based ink (A) is ejected on a printing medium before ejecting either or all of the oil-based inks (B) ((A)→(B)→(B), (B)→(A)→(B), (B)→(B)→(A)→(B), (B)→(A)→(B)→(B), etc.). When using two kinds or more of the oil-based inks (A) and one kind of the oil-based ink (B), either or all of the oil-based inks (A) are ejected on a printing medium before ejecting the oil-based ink (B) (in order of (A)→(A)→(B)). When using each two kinds or more of the oil-based inks (A) and the oil-based inks (B), either or all of the oil-based inks (A) are ejected on a printing medium before ejecting either or all of the oil-based inks (B) (in order of (A)→(A)→(B)→(B), (A)→(B)→(A)→(B), (B)→(A)→(A)→(B), (A)→(B)→(A)→(B)→(B), (B)→(A)→(A)→(B)→(B), etc.). More specifically, even when using each one kind of the oil-based ink (A) and the oil-based ink (B) and even when using each two kinds or more of the oil-based inks (A) and the oil-based inks (B), either or all of the oil-based inks (A) may be ejected before ejecting either one oil-based ink (B).

When using three kinds of more of oil-based inks, in order to improve both color development properties and weatherability, the kind (number) of the oil-based ink (A) is preferably the same or less than the kind (number) of the oil-based ink (B).

Figure 1B:
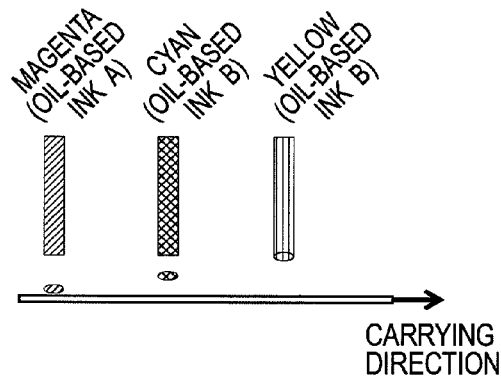
Figure 1B:
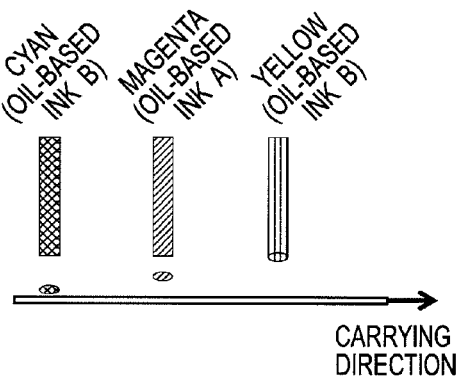

For example, when using three kinds of oil-based inks, the oil-based inks preferably include one kind of an oil-based ink (A) as in FIGS. 1B and 1B2, and are more preferably ejected as (A)→(B)→(B) as in FIG. 1B. Also, when using four kinds of oil-based inks, the oil-based inks preferably include one or two kinds of an oil-based ink (A), and more preferably include one kind of an oil-based ink (A). When using one kind of an oil-based ink (A), in order to enhance an effect of preventing strike through, it is more preferably ejected as (B)→(A)→(B)→(B) than (B)→(B)→(A)→(B), and further preferably ejected as (A)→(B)→(B)→(B).

The inkjet printing method, especially when a plurality of colors of inks containing a pigment is superposed and printed, the pigment in the ink to be first ejected preferentially occupies a region connectable with a printing medium, and the pigment in the ink to be ejected later cannot be connected to the vicinity of a surface of the printing medium, consequently, the pigment in the ink to be ejected later sinks inside the recording medium, thus strike through tends to deteriorate. Furthermore, when using a pigment obtained by insolubilizing a dye like a dye lake pigment, the dye in the pigment dissolves in the solvent, and strike through tends to further deteriorate. In the inkjet printing method of the present invention, an oil-based ink (A) containing a dye lake pigment is ejected in a specific order as described above, whereby it is possible to prevent strike through even when printed by superposing a plurality of colors of inks. This is because the oil-based ink (A) containing a dye lake pigment is ejected in an earlier stage, the dye lake pigment constituting the oil-based ink (A) can be connected to the vicinity of the surface of the printing medium, consequently, even when the dye constituting the dye lake pigment dissolves in a non-aqueous solvent and sinks, the sinking level of the dye is reduced.

Figure 1C:
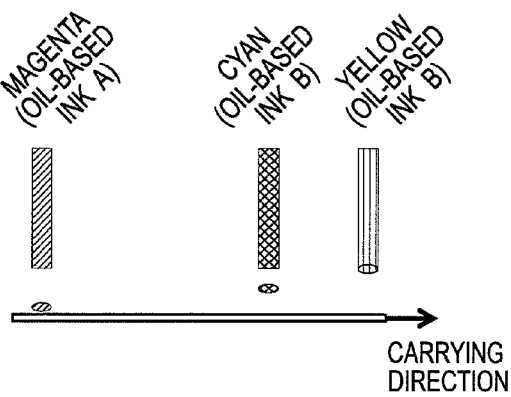

The ejection interval of each of the oil-based inks described above is not particularly limited, and as in FIG. 1C, it is preferred that the ejection interval between the ejection of the oil-based ink (A) and the ejection of the oil-based ink (B) ejected following the oil-based ink (A) is larger than the ejection interval between the ejection of the oil-based ink (B) and the ejection of other oil-based ink (B) ejected following the oil-based ink (B). When ejected as above, it is possible to further suppress strike through.

The method for adjusting the ejection interval of each oil-based ink is not particularly limited, and for example, in a printer that performs printing by ejecting each oil-based ink on a printing medium in order, from an inkjet head holding each oil-based ink while carrying the printing medium, each inkjet head is arranged at different intervals (distance), and the printing medium is carried at a constant rate and printed, whereby the ejection interval of each oil-based ink can be adjusted. In addition, each inkjet head is arranged at equal intervals (distance), and the printing medium is carried at a different rate between inkjet heads, whereby the ejection interval of each oil-based ink can be adjusted.

The inkjet printer is, for example, an inkjet printer used in the inkjet printing method of the present invention described above. The inkjet printer of the present invention is an inkjet printer using so called "single path system", and using a line type inkjet head (line head) in which a plurality of inkjet heads is arranged at a length longer that the width of the printing range, when the printing medium once passes under a line head, all printing regions are formed and printed.

The constitution of the inkjet printer of the present invention is not particularly limited as long as the inkjet printing using the "single path system" is possible, and at least includes a paper feed section that supplies a printing medium, and a printing section arranged downstream thereof.

The printing section includes a carrying section that carries a printing medium and an inkjet head section that ejects each oil-based ink described above on a printing medium. The carrying section includes a carrying belt provided opposite to the inkjet head section and a driving means that drives the carrying belt. The inkjet head section includes an inkjet head (a) holding the oil-based ink (A), and an inkjet head (b) holding the oil-based ink (B). The inkjet heads (a) and (b) are arranged above the carrying belt, and each constitutes a plurality of line type inkjet heads in which a plurality of nozzles is arranged in a direction orthogonal to the carrying direction of the printing medium. The inkjet head section prints an image by ejecting an oil-based ink from each inkjet head on the printing medium supplied from the paper feed section and carried by the carrying belt.

In the inkjet printer, the inkjet heads (a) and (b) constitute each different line head, and each line head is arranged in a fixed order. Specifically, when the number of the inkjet head (a) and the inkjet head (b) is each one, the inkjet head (a) is arranged in an upstream in the carrying direction of the printing medium, and the inkjet head (b) is arranged in a downstream. In addition, when the number of the inkjet head (a) is one, and the number of the inkjet head (b) is two or more, the inkjet head (a) is arranged in an upstream of either or all of the inkjet heads (b). Moreover, when the number of the inkjet head (a) is two or more, and the number of the inkjet head (b) is one, either or all of the inkjet heads (a) is arranged in an upstream of the inkjet head (b). Also, when the number of the inkjet head (a) and the inkjet head (b) is each two or more, either or all of the inkjet heads (a) is arranged in an upstream of either or all of the inkjet heads (b). More specifically, even when the number of the inkjet heads (a) and (b) is one or two or more, at least one inkjet head (a) may be arranged in an upstream of either inkjet head (b).

The distance between each inkjet head described above is not particularly limited, and it is preferred that the distance between the inkjet head (a) and the inkjet head (b) closest in a downstream of the inkjet head (a) is larger than the distance between the inkjet head (b) and the inkjet head (b) closest in a downstream of the inkjet head (b).

EXAMPLES

Hereinbelow, the present invention will be described in detail, and the present invention is not limited to the examples described in the following description.

<Preparation of Oil-Based Ink (A) Containing Dye Lake Pigment>

An oil-based ink containing a dye lake pigment (Ink No. 1 and Ink No. 2) was prepared by the following method. Specifically, the following ink raw materials were mixed, and sufficiently dispersed with a bead mill (Rocking mill RMO5S, manufactured by SEIWA GIKEN Co., Ltd.), and then filtered with 3.0 μm and 0.8 μm membrane filter in order to remove dust and coarse particles, to prepare an ink composition.

Ink Raw Materials

| | |
|---|---|
| Pigment (coloring material listed in Table 1 below) | 7 parts by mass |
| Dispersant (Solsperse 11200, manufactured by Lubrizol Japan Limited) | 6 parts by mass |
| Diethyl sebacate | 30 parts by mass |
| Ethyl linoleate | 25 parts by mass |
| Petroleum hydrocarbon solvent (AF solvent No. 4, manufactured by JX Nippon Oil & Energy Corporation) | 32 parts by mass |

<Preparation of Oil-Based Ink (B) Containing Pigment Other than Dye Lake Pigment>

An oil-based ink containing a pigment other than a dye lake pigment (Ink No. 3 to Ink No. 6) was prepared in the same manner as the oil-based ink (A) containing a dye lake pigment, except for changing the used pigment to the coloring material listed in Table 1 below.

The color of each ink described above and the used pigment are as shown in Table 1 as below.

TABLE 1

| Ink No. | Color | Used Pigment | Remarks |
|---|---|---|---|
| 1 | Magenta | P. R. 81:1 | Dye Lake Pigment (Oil-Based Ink (A)) |
| 2 | Blue | P. B. 1 | Dye Lake Pigment (Oil-Based Ink (A)) |
| 3 | Magenta | P. R. 57:1 | Soluble Azo Lake Pigment (Oil-Based Ink (B)) |
| 4 | Cyan | P. B. 15:3 | Metal Phthalocyanine Pigment (Oil-Based Ink (B)) |
| 5 | Yellow | P. Y. 180 | Insoluble Azo Pigment (Oil-Based Ink (B)) |
| 6 | Black | P. B. 7 | Carbon Black (Oil-Based Ink (B)) |

<Preparation of Printed Matter 1>

A printed matter was prepared by the following method.

Using a line head inkjet printer (ORPHIS X9050, manufactured by RISO KAGAKU CORPORATION), a solid image of Ink No. 1 and Ink No. 5 were printed on a plain paper (RISO paper light, manufactured by RISO KAGAKU CORPORATION). The printing conditions were a resolution of 300×300 dpi, and an ejected amount of each ink per a dot of 24 pL.

After printing, the printed matter was allowed to stand for one day under an environment of 23° C. and 50% RH, and defined as "printed matter 1".

A printed matter was prepared as in the same manner as the printed matter 1 described above, except for reversing the order of ejecting inks, and defined as "printed matter 1'".

Printed matters 2 to 4, printed matters 2' to 4', comparative printed matters 1 to 2 and comparative printed matters 1' to 2' were prepared as in the same manner as the printed matter 1 described above, except for changing each of the combination of inks and the order of ejecting inks as shown in Table 2 below.

TABLE 2

| | | | Order of Ejection | |
|---|---|---|---|---|
| | Ejected Ink | | | |
| Ink Combination Example | Ink 1 | Ink 2 | Ejection Example (Ink 1→Ink 2) | Ejection Comparative Example (Ink 2→Ink 1) |
| Combination Example 1 | No.1 | No.5 | Printed Matter 1 | Printed Matter 1' |
| Combination Example 2 | No.1 | No.4 | Printed Matter 2 | Printed Matter 2' |
| Combination Example 3 | No.2 | No.5 | Printed Matter 3 | Printed Matter 3' |
| Combination Example 4 | No.2 | No.4 | Printed Matter 4 | Printed Matter 4' |
| Combination Comparative Example 1 | No.3 | No.5 | Comparative Printed Matter 1 | Comparative Printed Matter 1' |
| Combination Comparative Example 2 | No.3 | No.4 | Comparative Printed Matter 2 | Comparative Printed Matter 2' |

<Evaluation of Chroma>

Chroma was evaluated for each of the printed matters 1 to 2, printed matters 1' to 2', comparative printed matters 1 to 2 and comparative printed matters 1' to 2'. Specifically, on one day after preparing the printed matters, chroma was measured with a spectrophotometer (i1/iO, manufactured by X-Rite Inc.), and calculated using the following equation.

$$\text{Chroma } c^* = \{(a^*)^2 + (b^*)^2\}^{1/2}$$

Here, both of the printed matter 1 and the comparative printed matter 1 are printed matters prepared by ejecting magenta (Ink No. 1 or 3) and yellow (ink No. 5), and exhibit the same color tone. In addition, both of the printed matter 2 and the comparative printed matter 2 are those prepared by ejecting magenta (Ink No. 1 or 3) and cyan (Ink No. 4), and exhibit the same color tone. The evaluation results are shown in Table 3 below.

TABLE 3

| Chroma | | | |
|---|---|---|---|
| Printed Matter 1 | Printed Matter 1' | Printed Matter 2 | Printed Matter 2' |
| 58.58 | 55.78 | 44.76 | 45.89 |
| Comparative Printed Matter 1 | Comparative Printed Matter 1' | Comparative Printed Matter 2 | Comparative Printed Matter 2' |
| 41.36 | 40.75 | 28.93 | 30.02 |

It was shown from the result of Table 3 above that, in each printed matter exhibiting the same color tone, the printed matters 1 and 2 included in the scope of the present invention can obtain chroma higher than comparative printed matters 1 and 2 that do not use an oil-based ink containing a dye lake pigment. In addition, it was shown from the comparison of the printed matters 1 and 2 with the printed matters 1' and 2' that, even when an oil-based ink containing a dye lake pigment was ejected later than an oil-based ink containing a pigment other than a dye lake pigment, high chroma can be maintained.

<Evaluation of Difference in Strike Through Due to Ejection Order>

In each printed matter in Table 2, the difference in strike through when changing the order of ejecting inks was evaluated. Specifically, the L*a*b* value of the back side of each printed matter was measured using a spectrophotometer ("i1/iO", manufactured by X-Rite Inc.), and the difference (difference value) was calculated and evaluated.

Here, the difference value means a difference of a strike through ($\Delta E$) of the printed matter prepared according to the ejection comparative example and a strike through ($\Delta E$) of the printed matter prepared according to the ejection example in one combination example of inks. For example, in the case of Combination Example 1, it means a difference of $\Delta E$ of the printed matter 1' and a difference of $\Delta E$ of the printed matter 1. $\Delta E$ is represented by the following equation.

$$\Delta E = \{(L^* - L^{*\prime})^2 + (a^* - a^{*\prime})^2 + (b^* - b^{*\prime})^2\}^{(1/2)}$$

Here, (L*, a*, b*) is the L*a*b* value of the back side of the printed matter, and (L*', a*', b*') is the L*'a*'b*' value of paper white.

The evaluation result is shown in Table 4 below.

Here, in Table 4, for example, a difference value of printed matter 1'–printed matter 1 of 5.5 is the value obtained from the difference of the value of strike though of each printed matter (14.33-8.80), and a difference value of comparative printed matter 1'–comparative printed matter 1 of 1.2 is the value obtained from the difference of the value of strike though of each printed matter (11.30-10.14).

TABLE 4

|  | Printed Matter 1'-<br>Printed Matter 1 | Printed Matter 2'-<br>Printed Matter 2 | Printed Matter 3'-<br>Printed Matter 3 | Printed Matter 4'-<br>Printed Matter 4 |
|---|---|---|---|---|
| Difference Value | 5.5 | 1.4 | 2.6 | 1.5 |
| Evaluation | A | B | A | B |

|  | Comparative Printed Matter 1'-<br>Comparative Printed Matter 1 | Comparative Printed Matter 2'-<br>Comparative Printed Matter 2 |
|---|---|---|
| Difference Value | 1.2 | 1.2 |
| Evaluation | C | C |

Evaluation Criteria
A: Strike through is markedly reduced (difference value of 2.0 or more)
B: Strike through is reduced (difference value of 1.3 or more and less than 2.0)
C: Strike through is not reduced (difference value of less than 1.3)

It was shown from the result of Table 4 above that, in printed matters 1 to 4, an oil-based ink (A) containing a dye lake pigment is ejected prior to an oil-based ink (B) containing a pigment other than a dye lake pigment, thereby suppressing strike through.

As described above, in printed matters 1 to 4 corresponding to Examples of the present invention, both high chroma and reduction of strike through are achieved.

<Preparation of Printed Matter 2>

Printed matters 5 to 6 and printed matters 5' to 6' were prepared as in the same manner as the printed matter 1, except for changing the combination of inks and the order of ejecting inks as shown in Table 5 below. Here, ORPHIS X9050 used in the present test can eject only four colors of inks, thus, for the preparation of printed matter 6 and printed matter 6', one adding one column of head to ORPHIS X9050 so as to eject five colors of inks was used.

TABLE 5

| Ejection Order | |
|---|---|
| Ejection Example | Ejection Comparative Example |
| No.1→No.4→No.5<br>(Printed Matter 5) | No4→No.5→No.1<br>(Printed Matter 5') |
| No.1→No.2→No.4→No.6→No.6<br>(Printed Matter 6) | No.4→No.6→No.5→No.1→No.2<br>(Printed Matter 6') |

For each printed matter of Table 5, by the same method as <Evaluation of Difference in Strike Through Due to Ejection Order> described above, the difference in strike through in the case of changing the order of ejecting inks was evaluated.

The evaluation result is shown in Table 6 below.

TABLE 6

|  | Printed Matter 5'-<br>Printed Matter 5 | Printed Matter 6'-<br>Printed Matter 6 |
|---|---|---|
| Difference Value | 1.6 | 1.9 |
| Evaluation | B | B |

It was shown from the result of Table 6 above that, in the case of using two or more oil-based inks (B) containing a pigment other than a dye lake pigment, the oil-based ink (A) containing a dye lake pigment is ejected prior to at least one of the oil-based inks (B), thereby suppressing strike through.

<Evaluation of Strike Through by Ejection Interval>

Strike through in the case of changing the ejection interval of the oil-based ink was evaluated. Specifically, in the printed matter 1, strike though (ΔE) of the printed matter when the ejection interval of ink 1 and ink 2 during preparation was set to 0.3 seconds, 0.6 seconds and 45 seconds were measured and calculated. The result is shown in Table 7 as below.

TABLE 7

| Ejection Interval [sec] | 0.3 | 0.6 | 45 |
|---|---|---|---|
| ΔE | 11.33 | 11.01 | 8.8 |

It was shown from the result of Table 7 above that, the larger the ejection interval of the oil-based ink containing a dye lake pigment and the oil-based ink containing a pigment other than a dye lake pigment, thereby suppressing strike through.

The inkjet printing method of the present invention and the inkjet printer using the printing method can achieve high color development properties and reduction of strike through in a printed matter, and can be widely utilized in the field of inkjet printing.

What is claimed is:

1. An inkjet printing method comprising:
   ejecting an oil-based ink (A) containing a dye lake pigment onto a printing medium;
   ejecting an oil-based ink (B) containing a pigment other than dye lake pigments onto the printing medium, and
   ejecting an oil-based ink (B') containing a pigment other than dye lake pigments onto the printing medium,
   wherein the oil-based ink (A) is ejected onto the printing medium prior to the oil-based ink (B), so that the oil-based ink (B) is disposed on the oil-based ink (A) on the printing medium, and
   wherein the color of the oil-based ink (B) is different from the color of the oil-based ink (B').

2. The inkjet printing method according to claim 1, wherein the oil-based ink (A) is ejected onto the printing medium prior to the oil-based ink (B) and the oil-based ink (B').

3. The inkjet printing method according to claim 2, wherein the ejection interval between ejection of the oil-based ink (A) and ejection of the oil-based ink (B) is larger than the ejection interval between ejection of the oil-based ink (B) and ejection of the oil-based ink (B').

4. The inkjet printing method according to claim 1, wherein the dye lake pigment is a pigment obtained by laking a xanthene derivative dye.

5. The inkjet printing method according to claim 1, wherein the dye lake pigment is a pigment obtained by laking a triphenylmethane derivative dye.

6. An inkjet printer comprising:
- an inkjet head (a) holding an oil-based ink (A) containing a dye lake pigment,
- an inkjet head (b) holding an oil-based ink (B) containing a pigment other than dye lake pigments, and
- an inkjet head (b') holding an oil-based ink (B') containing a pigment other than dye lake pigments,
- a carrying part of carrying the printing medium positioned to face the inkjet head, wherein
- the inkjet head (a) is positioned upstream of the inkjet head (b) in a direction of carrying the printing medium, and the color of oil-based ink (B) is different from the color of oil-based ink (B').

7. The inkjet printer according to claim 6, wherein, among the inkjet head (a), the inkjet head (b), and the inkjet head (b'), inkjet head (a) is positioned in the uppermost stream in the carrying direction of the printing medium.

8. The inkjet printer according to claim 7, wherein the printer is structured and configured to provide an ejection interval between the oil-based ink (A) and the oil-based ink (B) is larger than the ejection interval between the oil-based ink (B) and the oil-based ink (B').

9. The inkjet printer according to claim 6, wherein the dye lake pigment is a pigment obtained by laking a xanthene derivative dye.

10. The inkjet printer according to claim 6, wherein the dye lake pigment is a pigment obtained by laking a triphenylmethane derivative dye.

* * * * *